United States Patent [19]

Nakayama et al.

[11] Patent Number: 5,121,268
[45] Date of Patent: Jun. 9, 1992

[54] APPARATUS FOR RECORDING AND/OR REPRODUCING INFORMATION WITH A LID FOR PROTECTING THE RECORDING MEDIUM AND A RECORDING MEDIUM LOADING/EJECTING MECHANISM

[75] Inventors: Shigeru Nakayama, Higashimurayama; Makoto Tani, Tokyo, both of Japan

[73] Assignee: Teac Corporation, Tokyo, Japan

[21] Appl. No.: 557,610

[22] Filed: Jul. 24, 1990

[30] Foreign Application Priority Data

Jul. 25, 1989 [JP] Japan .................. 1-87137[U]

[51] Int. Cl.⁵ ............................ G11B 15/18
[52] U.S. Cl. ........................ 360/71; 360/96.5
[58] Field of Search ............ 360/71, 96.5, 96.6, 360/93

[56] References Cited

U.S. PATENT DOCUMENTS

| | | | |
|---|---|---|---|
| 4,308,562 | 12/1981 | Negishi | 360/96.5 X |
| 4,635,147 | 1/1987 | Durand et al. | 360/93 |
| 4,635,148 | 1/1987 | Kusaka | 360/96.6 |
| 4,642,714 | 2/1987 | Miyamoto | 360/96.5 |
| 4,680,654 | 7/1987 | Shibuya | 360/96.5 |
| 4,835,636 | 5/1989 | Kanai et al. | 360/96.5 |
| 4,851,938 | 7/1989 | Inami | 360/69 |
| 4,933,790 | 6/1990 | Mitumaru | 360/96.5 |

Primary Examiner—John H. Wolff
Attorney, Agent, or Firm—Michael N. Meller

[57] ABSTRACT

An apparatus for recording and/or providing with a lid for protecting the recording medium and a recording medium loading/ejecting mechanism that includes a housing, an inlet provided on a wall of the housing, a cassette which is loaded in and ejected from the housing through the inlet. The lid member is capable of being opened and closed and covers the inlet when it is closed. The apparatus includes a mechanism for loading the cassette inserted in the inlet to a loading position and ejecting the cassette from the loaded position to an ejection position. A detector detects whether the lid member is opened or closed. In addition, there is a controller for controlling the mechanism. The controller includes a loading controller for controlling the mechanism when the cassette is inserted in the inlet and is loaded in the loaded position. There is an ejecting controller for controlling the mechanism so that the cassette loaded in the loaded position is ejected to the ejection position when the detection system detects that the lid member is opened after detecting that the lid member has been closed.

10 Claims, 6 Drawing Sheets

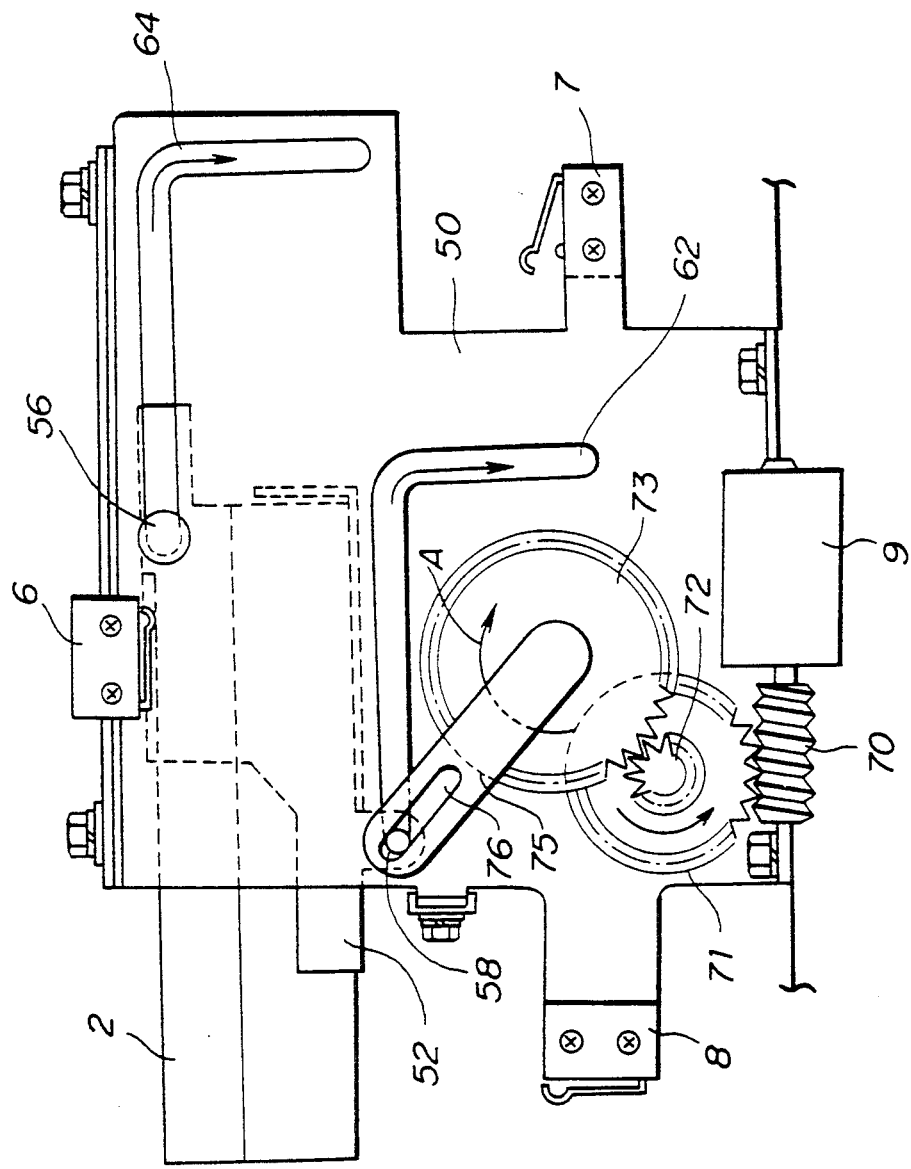

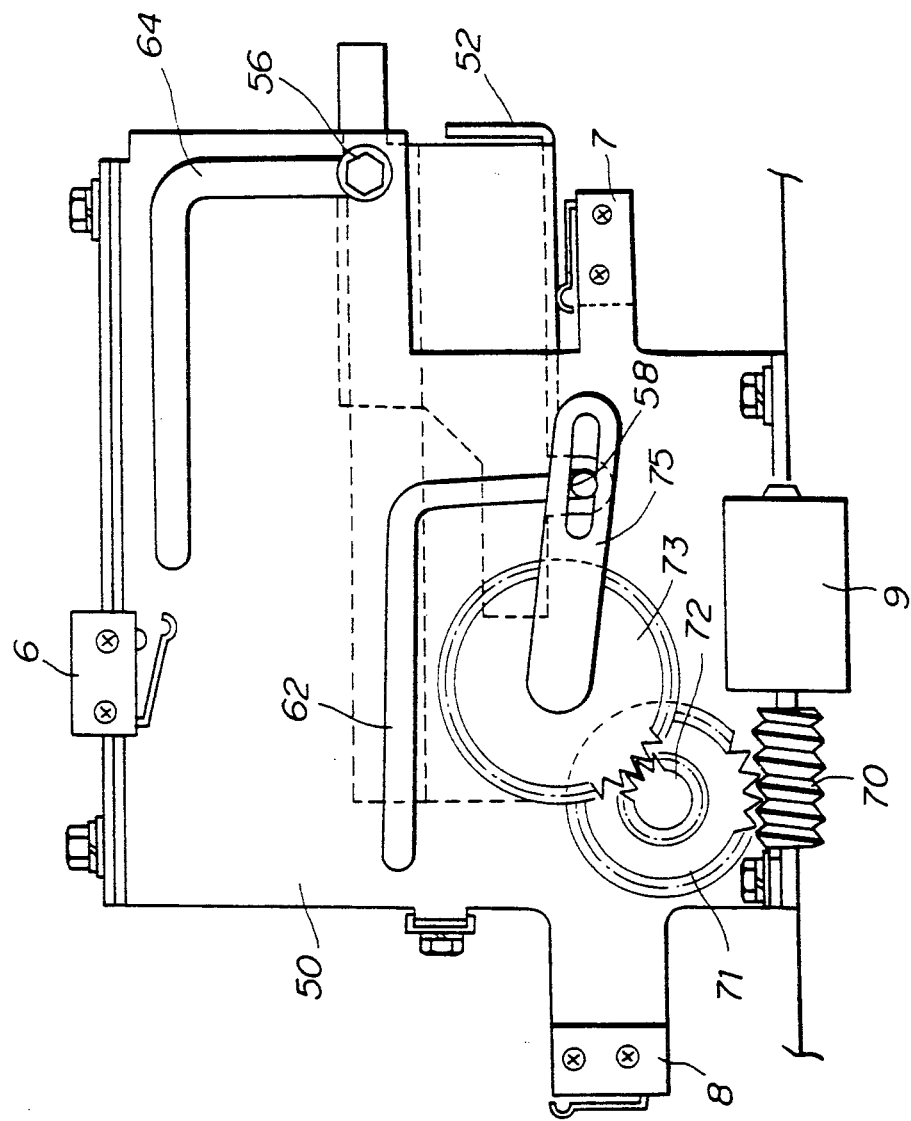

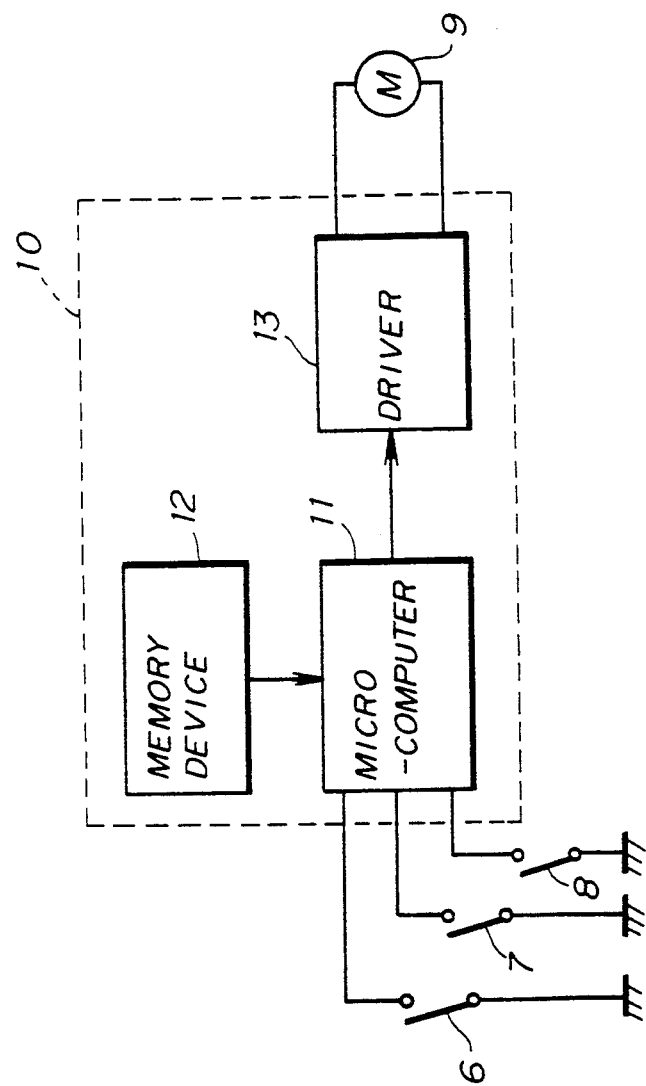

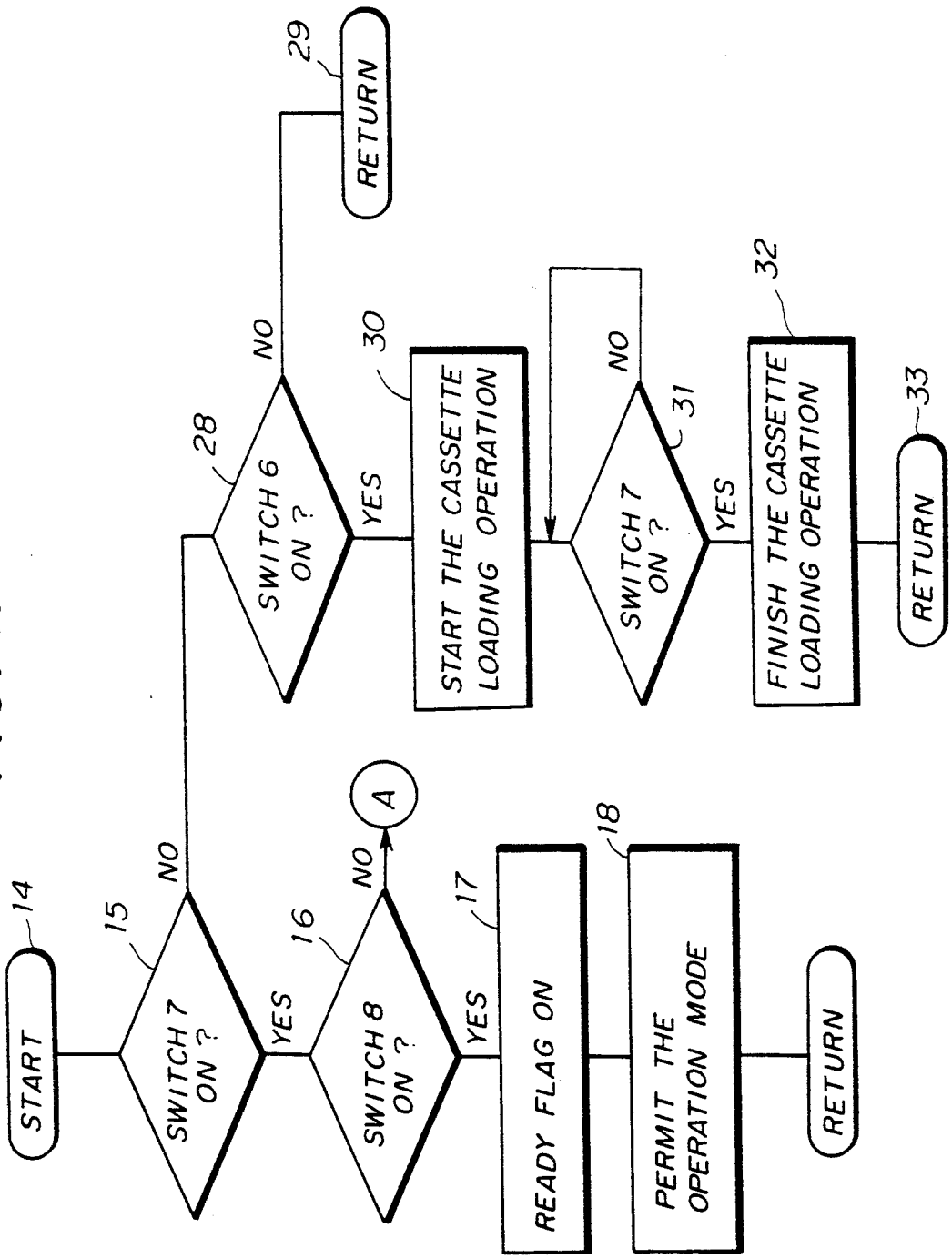

APPARATUS FOR RECORDING AND/OR REPRODUCING INFORMATION WITH A LID FOR PROTECTING THE RECORDING MEDIUM AND A RECORDING MEDIUM LOADING/EJECTING MECHANISM

BACKGROUND OF THE INVENTION

The present invention generally relates to an apparatus for recording and/or reproducing information, and more particularly to an apparatus for recording and/or reproducing information and having a lid member which covers an inlet for inserting a cassette housing a recording medium.

Conventionally, an apparatus for recording and/or reproducing information such as a video tape recorder (hereinafter simply referred to as a VTR) which is used indoors and one used outdoors have been proposed. The VTR used outdoors has a housing of a drip proof structure so that it is possible to prevent rain drops and dust from coming into the housing. In addition, it is necessary for a cassette insertion inlet through which a video cassette is loaded and ejected to be securely covered by a lid member so that the cassette insertion inlet can be formed as a drip proof structure. In this type of VTR, after the lid member covering the cassette insertion inlet is opened, a user manually loads the cassette in a loading position in the VTR. Then, the user takes out the cassette from the VTR.

In this type of VTR, it is also possible for the cassette to be automatically loaded and ejected by a driving mechanism having a motor, in the same manner as a general VTR.

In conventional VTRs having the drip proof structure in which the user loads and ejects the cassette manually, there are cases where the cassette is incompletely loaded in the loading position. It is also troublesome to load the cassette into and eject it from the VTR. In the VTR having the drip proof structure in which the cassette is automatically loaded and ejected by the driving mechanism, when the ejection operation of the cassette is mistakenly performed in the state where the lid member covers the cassette insertion inlet, there are cases that a device, the cassette or the like is broken since the lid member securely covers the cassette insertion inlet. In addition, it is necessary for a button for an ejection operation of the cassette to have the drip proof structure so that the structure of the device is complicated, and it is difficult to keep the device water-tight.

SUMMARY OF THE INVENTION

Accordingly, a general object of the present invention is to provide a novel and useful apparatus for recording and/or reproducing information in which the disadvantages of the aforementioned prior art are eliminated.

A more specific object of the present invention is to provide an apparatus for recording and/or reproducing information having a lid member covering an inlet for insertion of a cassette housing a recording medium.

Another object of the present invention is to provide an apparatus for recording and/or reproducing information having a simple structure and capable of automatically ejecting the cassette housing the recording medium.

The above objects of the present invention can be achieved by an apparatus for recording and/or reproducing information comprising a housing, an inlet provided on a wall of the housing, a cassette housing a recording medium which is loaded in and ejected from the housing through the inlet, a lid member provided on the wall of the housing and capable of opening and closing, the lid member covering the inlet at a time of closing, a mechanism provided in the housing for loading the cassette inserted in the inlet in a loading position and ejecting the cassette from the loading position to a ejection position, the cassette projecting from the inlet when the cassette is in the ejection position, detection means for detecting whether the lid member is opened or closed, and control means for controlling the mechanism, the control means comprising loading control means for controlling the mechanism so that the cassette inserted in the inlet is loaded in the loading position, and ejecting control means for controlling the mechanism so that the cassette loaded in the loading position is ejected to the ejection position when the detection means detects that the lid member is opened after detecting that the lid member is closed.

Additional objects, features and advantages of the present invention will become apparent from the following detailed description when read in conjunction with the accompanying drawings.

BRIEF DESCRIPTION OF THE DRAWINGS

FIGS. 2A and 2B illustrates a loading and ejecting mechanism in the VTR shown in FIGS. 1A through 1C;

FIG. 3 is a block diagram illustrating a control circuit shown in FIGS. 1A through 1C;

FIGS. 4A and 4B are flowcharts illustrating the operation of the control circuit shown in FIGS. 1A through

DESCRIPTION OF THE PREFERRED EMBODIMENTS

A description will now be given of a preferred embodiment of the present invention with reference to FIGS. 1A through 4.

Figure 1A:
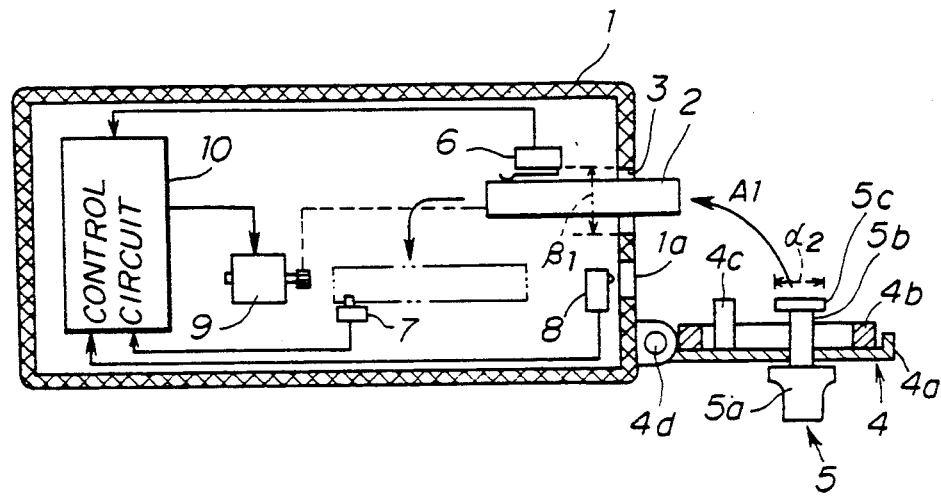
FIGS. 1A through 1C are sectional views illustrating a fundamental structure of the VTR of a preferred embodiment, according to the present invention.
Figure 1B:
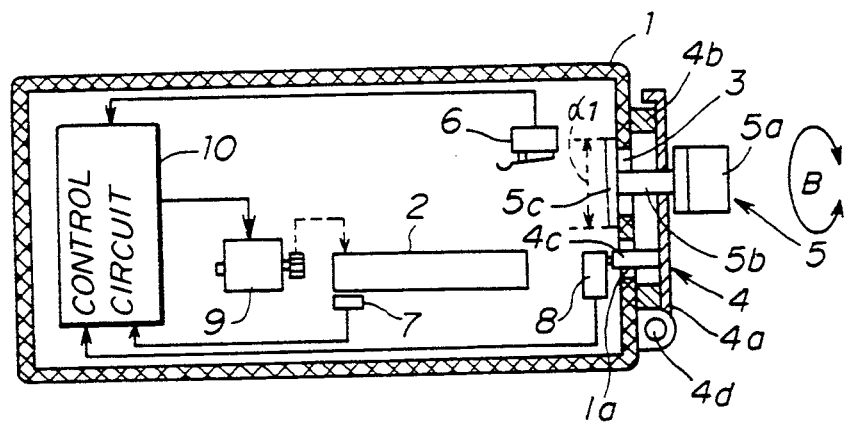
Figure 1C:
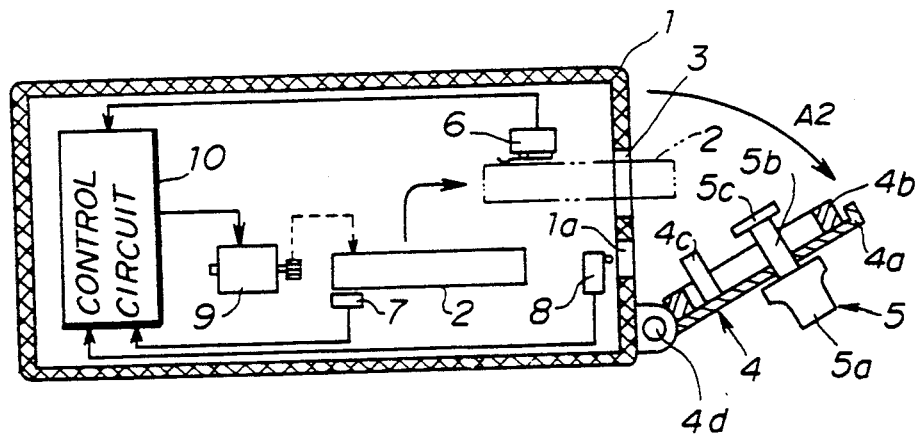

Referring to FIGS. 1A through 1C, there is a VTR having a drip proof structure. A housing 1 of the VTR houses a variety of mechanisms and circuits. An inlet 3 is formed on a side wall of the housing 1. A cassette 2 housing a magnetic tape (a video tape) is inserted and ejected through the inlet 3. The side wall on which the inlet 3 is formed is covered by a lid member 4. The lid member has a plate 4a, a packing 4b and an engagement member 5. The plate 4a rotatably engages with a shaft 4d provide on a bottom of the side wall of the housing 1 in the directions shown by arrows A1 and A2. That is, the plate 4a pivots on the shaft 4d. The packing 4b is made of rubber. The packing 4b is fixed on an edge around the inner surface of the plate 4a. Therefore, the packing 4b can contact with the side wall of the housing 1, so that when the lid member 4 covers the inlet 3, the lid member 4 prevents water droplets from going into the housing 1.

The lid member 4 covers the side wall of the housing 1 on which the inlet 3 is formed and is engaged with the housing 1 by an engagement member 5. The engagement member 5 is rotatably provided on the plate 4a of the lid member 4. The engagement member 5 has a knob 5a, a shaft 5b and engagement portion 5c. The shaft 5b is rotatably supported in a direction shown by an arrow B by the plate 4a. The shaft 5b fits in the plate 4a so that no water droplet comes into the inside of the plate 4a. The engagement portion 5c is fixed on an end of the shaft 5b opposite to an end on which the knob 5a is fixed. The engagement portion 5c is an oval-shaped plate. The length thereof in the major axis direction is ($\alpha$1). The length ($\alpha$1) is slightly less than the longitudinal length ($\beta$1) of the inlet 3. The length of the engagement portion 5c in the minor axis direction is ($\alpha$2). The length ($\alpha$2) is slightly greater than the longitudinal length ($\beta$1) of the inlet 3. When the lid member 4 is closed and covers the inlet 3 the packing 4b is pressed to the side wall of the housing 1. Then, the engagement portion 5b of the engagement member 5 is inserted through the inlet 3 into the housing 1 and the knob 5a is rotated so that the engagement portion 5b contacts with a housing 1 areas adjacent to the inlet 3 and engages with the inlet 3, as shown in FIG. 1B. When the lid member 4 is opened the knob 5a is rotated and the minor axis direction of the engagement portion 5c is in accordance with the longitudinal direction of the inlet 3 so that the engagement portion 5c comes off from the housing 1 areas adjacent to the inlet 3 and the lid member 4 is rotated in the direction shown by the arrow A2, as shown in FIG. 1C.

A switch 6 is provided in the vicinity of the inlet 3. The switch 6 turns ON when the cassette 2 is inserted in the inlet 3. A switch 7 is provided at a position corresponding to a loading position of the cassette where the magnetic tape housed in the cassette is driven. The switch 7 detects whether or not the cassette 2 is loaded at the loading position. When the cassette 2 is loaded at the loading position the switch 7 turns ON. A hole 1a is formed under the inlet 3 on the side wall of the housing 1. A switch 8 is provided in the housing 1 so as to face to the hole 1a. A pusher bar 4c projects from the inner surface of the plate 4a. When the lid member 4 is closed the switch 8 is pushed by the pusher bar 4c passing through the hole 1a so that the switch 8 turns ON. That is, the switch 8 turns ON and OFF according to the closing of the lid member 4 and the opening thereof, and the switch 8 detects whether or not the lid member 4 covers the inlet 3.

A loading and ejecting mechanism is driven by a motor 9. The loading and ejection mechanism moves the cassette 2 between an ejection position where the cassette 2 is taken out and the loading position. The motor 9 is controlled by the control circuit 10. The cassette 2 is loaded in and ejected from the housing 1 on the basis of the controlling of the control circuit 10.

The loading and ejecting mechanism is, for example, formed as shown in FIGS. 2A and 2B. Referring to FIGS. 2A and 2B which indicate side views of the loading and ejecting mechanism, a frame 50 is provided with L-shaped guide holes 62 and 64. The L-shaped guide holes 62 and 64 are parallel with each other. A cassette holder 52 holding the cassette 2 inserted through the inlet 3 is provided with two supporting bars 56 and 57. The supporting bar 56 slidably engages with the guide hole 64 and the supporting bar 58 slidably engages with the guide hole 62 so that the cassette holder 52 is slidably supported by the frame 50. Another side of the cassette holder 52 opposite to the frame 50 is also supported in the same manner as shown in FIG. 2A. A first gear 71 and a second gear 73 are respectively rotatably provided on the frame 50. A small gear 72 is fixed on the first gear 71 so as to be coaxial. An end of a driving arm 75 is fixed to the center of the second gear 73 so that the driving arm 75 pivots on the center of the second gear 73 while the second gear 73 rotates. A worm 70 is provided on the shaft of the motor 9. The worm 70 engages with the first gear 71, and the small gear 72 engages with the second gear 73. A slotted hole 76 is formed at an end of the driving arm 75 opposite to the end fixed to the second gear 73. The supporting bar 58 also engages with the slotted hole 76 of the driving arm 75. When the cassette is loaded in the VTR, the motor 9 is driven and the shaft of the motor 9 rotates in a predetermined direction. Then the gears 71, 72 and 73 rotate so that the driving arm 75 rotates in a direction shown by an arrow (A). Because of this rotation of the driving arm 75, the supporting bar 58 slides along the guide hole 62, and then, the supporting bar 56 also slides along the guide hole 64 at the same time. As a result, the cassette holder 52 moves, as shown in FIG. 2B, until the cassette 2 reaches the loading position. When the cassette 2 is ejected, the motor 9 rotates in a backward direction. Then the supporting bars 58 and 59 slide in a direction opposite to the direction at the time of loading the cassette 2. As a result, the cassette holder 52 moves, as shown in FIG. 2A, until the cassette 2 reaches the ejection position.

The switch 6 is fixed on an upper side of the frame 50 and the switch 7 is fixed on a rear side of the frame 50. Then, the switch 6 turns ON when the cassette 2 is inserted in the inlet 3, as shown in FIG. 2A. The switch 7 turns ON when the cassette 2 is loaded at the loading position, as shown in FIG. 2B. The switch 8 is fixed on a front side of the frame 50.

The control circuit 10 is, for example, made as shown in FIG. 3. Referring to FIG. 3, the control circuit 10 has a micro-computer 11, a memory device 12, and a driver 13. In the control circuit 10, the micro-computer 11 operates in accordance with the program stored in the memory device 12. Then, the micro-computer 11 outputs controlling signals on the basis of the ON and OFF states of the switches 6, 7 and 8. The controlling signals are supplied to the driver 13. The driver 13 drives the motor 9 in accordance with the controlling signals. That is, the loading and ejecting of the cassette 2 are controlled by the control circuit 10.

A description will now be given of the operation of the control circuit 10 with reference to FIG. 4.

Figure 4B:
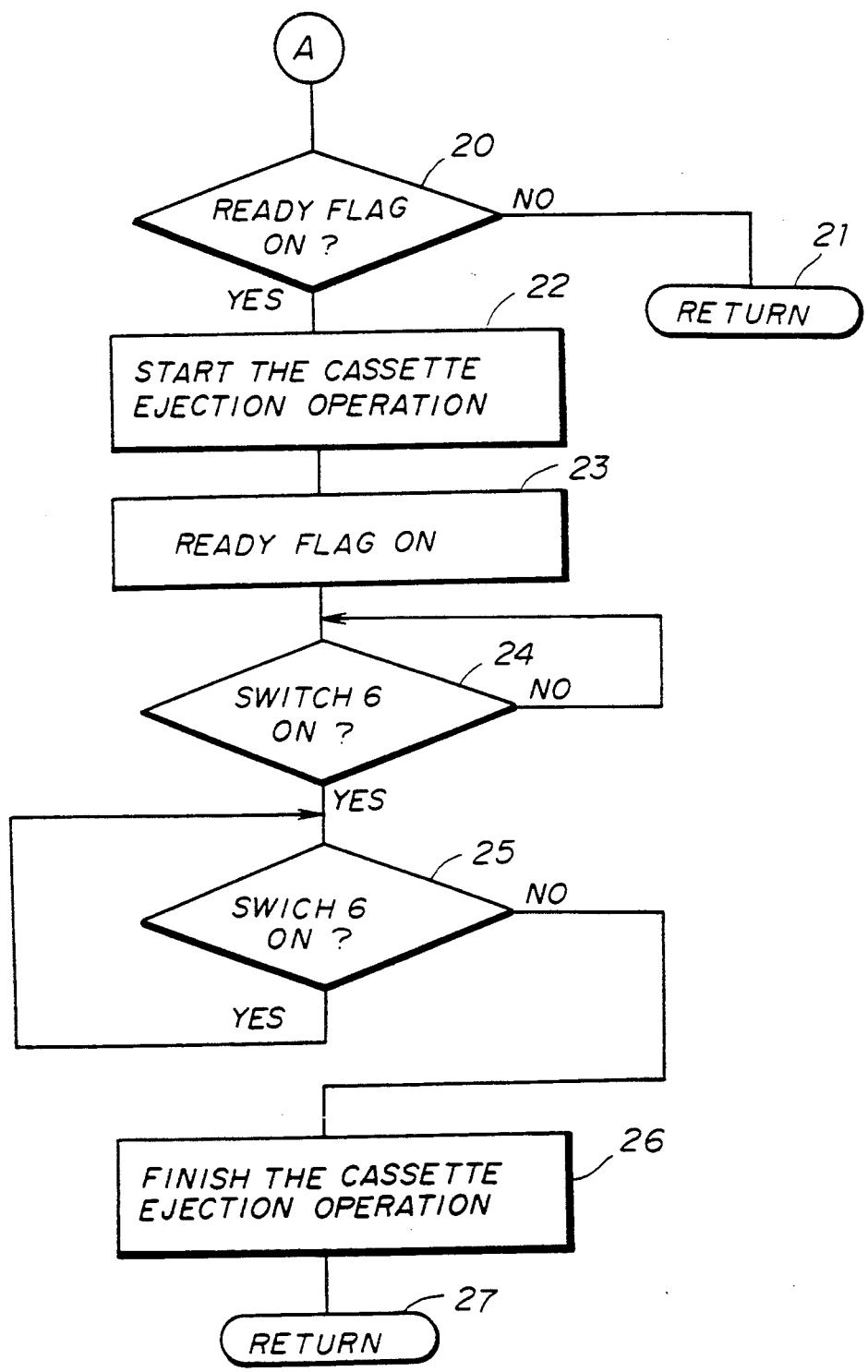

The control circuit 10 controls the motor 9 in accordance with the flowcharts shown in FIG. 4A and 4B. The control starts at the same time as the power is turned ON (step 14). Step 15 determines whether or not the cassette 2 is in the loading position where the cassette 2 engages with reel shafts (not shown in FIGS. 1A through 1C) on the basis of the state of the switch 7. If the switch 7 is ON and step 15 determines that the cassette 2 is in the loading position, step 16 determines whether or not the lid member 4 is closed on the basis of the state of the switch 8. If the switch 8 is ON and step 16 determines that the lid member 4 is closed, since the lid member 4 covers the inlet 3 and the cassette 2 is in the loading position, the micro-computer 11 raises a ready-flag (the ready-flag becomes ON) which indicates the state where it is possible to perform a variety of operations in the micro-computer 11 (step 17) That is, in the micro-computer 11, a variety of operations, such as the recording operation and the reproducing operation, can be performed (step 18). Then, the control returns to step 14.

On the other hand, if the switch 8 is OFF and step 16 determines that the lid member 4 is opened, step 20 determines whether or not the ready-flag is ON. That is, it is determined whether or not the lid member 4 is opened after it has once been closed. If the ready-flag is OFF, since switch 8 is not ON yet, the control returns to step 14 (step 21). If step 20 determines that the ready-flag is ON, the motor 9 is rotated and the ejection operation of the cassette 2 is started (step 22). Then, step 23 lowers the ready-flag (the ready-flag becomes OFF). Due to the process of step 22, the loading and ejecting mechanism ejects the cassette 2, that is, the cassette 2 is moved from the loading position to the ejection position. At this time, step 24 determines whether or not the switch 6 is ON. If step 24 determines that the switch 6 is on, furthermore, step 25 also determines whether or no the switch 6 is ON. Then, if step 25 determines that switch 6 is OFF, since the cassette 2 is completely ejected from the inlet 3, the ejection operation is finished (step 26). After the cassette 2 is ejected, the control returns to step 14 (step 27).

If the cassette 2 is not loaded and step 15 described above determines that the switch 7 is OFF, step 28 determines whether or not the switch 6 is ON. If the cassette 2 is not inserted in the inlet 3 and step 28 determines that the switch 6 is OFF, the control returns to step 14 (step 29). On the other hand, if the cassette 2 is inserted in the inlet 3 and the step 28 determines that the switch 6 is ON, the motor 9 is rotated and the loading operation of the cassette 2 is started (step 30). Due to the process of step 30, the loading and ejecting mechanism loads the cassette 2 in the VTR, that is, the cassette 2 is moved from the ejection position to the loading position. At this time, step 31 determines whether or not the switch 7 is ON. If the cassette 2 is perfectly loaded in the loading position and step 31 determines that the switch 7 is ON, the loading operation is finished (step 32). Then, the control returns to step 14 (step 33).

According to the embodiment described above, it is possible to load and eject the cassette on the basis of the ON and OFF states of the switches 6, 7 and 8 without manually operating the switches. Thus, the cassette 2 is automatically ejected only when the lid member 4 is opened so that there are no cases where the cassette 2 is ejected when the lid member 4 is closed and the device thus broken. That is, in the VTR having the drip proof structure, it is possible to provide the ejection mechanism which automatically ejects the cassette 2 so that the cassette 2 is completely loaded in and ejected from the VTR.

In the embodiment, a description has been given of the eject mechanism of the VTR. It is also possible for present invention to be applied to such the apparatus as for the recording and/or reproducing information such as a compact disc unit or an audio tape recorder.

According to the present invention, when the detection means such as the switch 8 detects that the lid member is opened after detecting that the lid member is closed, the cassette is automatically ejected through the inlet. Thus, the ejection operation of the cassette is automatically performed, due to the lid member being opened, without operating the ejection button so that the ejection operation is simple and it is possible to prevent the cassette from being ejected in the state where the lid member is closed.

The present invention is not limited to the aforementioned embodiments, and variations and modifications may be made without departing from the scope of the claimed invention.

What is claimed is:

1. In an apparatus for recording and/or reproducing information comprising:

a housing;

an inlet provided on a wall of said housing, a cassette housing a recording medium being loaded in and ejected from said housing through said inlet a lid member provided on said wall of said housing and capable of being opened and closed, said lid member covering said inlet when said lid member is closed;

a mechanism provided in said housing, for loading said cassette inserted in said inlet to a loaded position and ejecting said cassette from the loaded position to an ejection position, said cassette projecting from said inlet when said cassette is in the ejection position;

detection means for detecting whether said lid member is open or closed; and control means for controlling said mechanism, said control means comprising, loading control means for controlling said mechanism so that said cassette inserted in said inlet is loaded in the loaded position, and ejecting control means for controlling said mechanism so that said cassette loaded in the loaded position is ejected to the ejection position when said detection means detects that said lid member reopens after detecting that said lid member has been closed.

2. An apparatus as claimed in claim 1, wherein said detection means has a switch which turns ON and OFF in accordance with the opening and closing of said lid member.

3. An apparatus as claimed in claim 1, wherein said control means further comprises first position detection means for detecting whether or not said cassette is in the ejection position and second position detection means for detecting whether or not said cassette is in the loaded position, wherein said loading control means controls said mechanism until said second position detection means detects that said cassette is in the loaded position, and said ejecting control means controls said mechanism until said first position detection means detects that said cassette is in the ejection position.

4. An apparatus as claimed in claim 3, wherein said first position detection means has a first switch which turns ON and OFF in accordance with whether said cassette is in the ejection position or not.

5. An apparatus as claimed in claim 3, wherein said second position detection means has a second switch which turns ON and OFF in accordance with whether said cassette is in the loaded position or not.

6. An apparatus as claimed in claim 1, wherein said lid member has a member which acts on said detection means when said lid member closes, so that said detection means detects that said lid member closes when said member acts on said detection means.

7. An apparatus as claimed in claim 1, wherein said lid member has a drip proof structure, so that said lid member prevents water droplets from going into said housing.

8. An apparatus as claimed in claim 7, wherein said lid member has rubber fixed on a surface thereof facing to said wall of said housing, wherein said rubber is pressed on said wall when said lid member closes so that the water-tightness of said housing is maintained.

9. An apparatus as claimed in claim 1, wherein said lid member is rotatably supported by a shaft provided on said wall of said housing, so that said lid member pivots on said shaft.

10. An apparatus as claimed in claim 9, wherein said lid member has a engagement member which detachably engaging with said inlet, wherein said engagement member engages with said inlet so that said lid member closes.

* * * * *